(12) United States Patent
Guenther

(10) Patent No.: US 10,113,693 B2
(45) Date of Patent: Oct. 30, 2018

(54) LUBRICANT DISTRIBUTOR FOR DISPENSING LUBRICANT TO AT LEAST ONE LUBRICATION POINT, AND METHOD FOR OPERATING SAID LUBRICANT DISTRIBUTOR

(71) Applicant: LINCOLN GMBH, Walldorf (DE)

(72) Inventor: Armin Guenther, Helmstadt-Bargen (DE)

(73) Assignee: SKF LUBRICATION SYSTEMS GERMANY GmbH, Walldorf (DE)

( * ) Notice: Subject to any disclaimer, the term of this patent is extended or adjusted under 35 U.S.C. 154(b) by 548 days.

(21) Appl. No.: 14/431,647

(22) PCT Filed: Sep. 25, 2013

(86) PCT No.: PCT/EP2013/069941
§ 371 (c)(1),
(2) Date: Jun. 3, 2015

(87) PCT Pub. No.: WO2014/048973
PCT Pub. Date: Apr. 3, 2014

(65) Prior Publication Data
US 2016/0033079 A1    Feb. 4, 2016

(30) Foreign Application Priority Data
Sep. 26, 2012  (DE) .......... 10 2012 217 452

(51) Int. Cl.
*F16N 25/02*    (2006.01)
*F16N 29/04*    (2006.01)
(Continued)

(52) U.S. Cl.
CPC .............. *F16N 25/02* (2013.01); *F16N 7/38* (2013.01); *F16N 7/385* (2013.01); *F16N 29/00* (2013.01); *F16N 29/04* (2013.01)

(58) Field of Classification Search
CPC . F16N 25/02; F16N 7/38; F16N 29/04; F16N 7/14
See application file for complete search history.

(56) References Cited

U.S. PATENT DOCUMENTS 4,364,452 A * 12/1982 Crago ..................... F16N 25/02
137/624.14
5,926,018 A *  7/1999 Jones ..................... G01D 5/145
324/207.22
(Continued)

FOREIGN PATENT DOCUMENTS

DE        4311338 A1   10/1994
DE   102006012810 A    9/2006
(Continued)

OTHER PUBLICATIONS

International Search Report from PCT/EP2013/069941.

*Primary Examiner* — William E Dondero
*Assistant Examiner* — Mark K Buse
(74) *Attorney, Agent, or Firm* — Bryan Peckjian; SKF USA Inc. Patent Dept.

(57) ABSTRACT

A lubricant distributor for delivering lubricant to at least one lubrication point includes a lubricant distributor housing with a cylinder bore, a metering piston mounted for reciprocal movement in the cylinder bore, and a detector connected at an end of the cylinder bore, the detector including an entry bore configured to receive a portion of the metering piston, and the entry bore being in fluid communication with the cylinder bore, and the detector including an interior space separated from the entry bore by a wall and a Hall sensor in the interior space. The detector is configured to output a detection signal in response to detecting the portion of the metering piston in the entry bore. Also a method of operating the lubricant distributor.

15 Claims, 5 Drawing Sheets

(51) Int. Cl.
*F16N 7/38* (2006.01)
*F16N 29/00* (2006.01)

(56) References Cited

U.S. PATENT DOCUMENTS

| | | | | |
|---|---|---|---|---|
| 6,832,620 | B2* | 12/2004 | Jaeger | F16N 13/02 |
| | | | | 137/237 |
| 7,367,428 | B2* | 5/2008 | Schmidt | F16N 25/02 |
| | | | | 184/6.1 |
| 8,844,679 | B2* | 9/2014 | Conley | F16N 7/14 |
| | | | | 184/6.28 |
| 9,212,779 | B2* | 12/2015 | Conley | F16N 7/14 |
| 2004/0040789 | A1* | 3/2004 | Rake | F16N 29/02 |
| | | | | 184/6.23 |
| 2006/0243529 | A1* | 11/2006 | Moilanen | F16N 7/385 |
| | | | | 184/29 |
| 2008/0202608 | A1* | 8/2008 | Tschida | F15B 13/0402 |
| | | | | 137/554 |
| 2009/0193965 | A1* | 8/2009 | Paluncic | F16N 25/02 |
| | | | | 92/61 |
| 2010/0282542 | A1* | 11/2010 | Wang | F16N 25/02 |
| | | | | 184/26 |
| 2012/0037457 | A1 | 2/2012 | Huang et al. | |
| 2013/0008745 | A1* | 1/2013 | Barrett | F02C 7/06 |
| | | | | 184/6.11 |
| 2013/0168187 | A1* | 7/2013 | Conley | F16N 7/14 |
| | | | | 184/6 |

FOREIGN PATENT DOCUMENTS

| | | |
|---|---|---|
| DE | 102006001317 A1 | 7/2007 |
| EP | 1235025 A1 | 8/2002 |
| EP | 2172683 A1 | 4/2010 |
| GB | 1235145 A | 6/1971 |

\* cited by examiner

LUBRICANT DISTRIBUTOR FOR DISPENSING LUBRICANT TO AT LEAST ONE LUBRICATION POINT, AND METHOD FOR OPERATING SAID LUBRICANT DISTRIBUTOR

CROSS-REFERENCE

This application is the U.S. National Stage of International Application No. PCT/EP2013/069941 filed on Sep. 25, 2013, which claims priority to German patent application no. 10 2012 217 452.4 filed on Sep. 26, 2012.

TECHNOLOGICAL FIELD

The present disclosure is directed to a lubricant distributor for delivering lubricant to at least one lubrication point. The disclosed lubricant distributor includes a lubricant distributor housing having a cylindrical bore in which a metering piston is disposed for back-and-forth movement. The distributor includes a detector device using which the position of the metering piston can be detected in at least one piston position, and the detector device includes a Hall sensor disposed in an adapter piece. The adapter piece is disposed on the lubricant distributor housing such that the Hall sensor can detect the metering piston when it is located in one of its end positions in the cylinder bore. The disclosure is also directed to a method for operating such a lubricant distributor.

BACKGROUND

Lubricant distributors of the above-described type are as such adequately known. They serve to deliver the lubricant in a metered manner to the lubrication points. They are frequently embodied in block construction and are designed for delivery of various metering volumes, wherein each lubricant distributor can include on each of its two end sides, for example, two threaded bores for the selective connection of two main lines of a centralized lubrication system. The lubricant distributor has, for example, eight threaded bores for connecting the lines to the lubrication points. The lubricant metering itself is effected by a metering piston, which is movably disposed in the lubricant distributor housing in a cylinder bore. With each stroke of the metering piston a defined quantity of lubricant is delivered. A control piston is usually provided for the controlling of the metering piston. The control piston opens and closes the two main lines. Depending on the pressurization of the first or the second main line, the control piston moves in the one or the other direction and thus releases one of the two main lines, whereby the metering piston also subsequently moves and delivers a corresponding quantity of lubricant.

In addition to these 2-line distributors, the same also analogously applies, of course, in the case of other embodiments, for example in the case of a progressive distributor.

A lubricant distributor of the above-mentioned type is disclosed in US 2006/0243529 A1. Lubricant distributors of a similar type are known, for example, from U.S. Pat. No. 5,926,018 A, from US 2010/0282542 A1, from DE 10 2006 012 810 A1, and from DE 10 2006 001 317 A1. In these documents the general function of the distributor is described in detail and the functionality explained in detail. In this respect reference is expressly made to these documents.

In the literature mentioned the problem is also already recognized that it is useful, and can be necessary for proper operation, to monitor the movement of the metering piston, i.e. to determine whether the metering piston completely performs its intended metering stroke. However, the measures described here are in part technically complex and therefore expensive. In particular, it is difficult to monitor the lubricant lines after the lubricant distributor, and namely both as regards a possible blockage of a line and as regards the possible tearing of a line.

SUMMARY

The object of the invention is to provide a lubricant distributor of the above-mentioned type as well as provide a method for its operation, so that it is possible to monitor the lubricant lines connecting to the distributor, with respect to blockage and with respect to tearing, with low complexity and thus economically in a process-stable manner. In addition, even without presence of a blockage or of a tear, the lubricating by the distributor should be easy to be able to be monitored with respect to regularity.

The solution of this object by the invention is characterized in that the adapter piece includes an entry bore for the metering piston in the end region facing the metering piston.

A threaded section can connect axially to the cylinder bore in at least one axial end region, wherein a screw section of the adapter piece is screwed-in. Here the diameter of the cylinder bore is preferably smaller than the diameter of the threaded section.

The adapter piece is preferably manufactured from stainless steel. According to a preferred embodiment the space formed by the entry bore, and a receiving space for the Hall sensor, are separated from each other by a continuous base. This facilitates the sealing of the system.

The method for operating such a lubricant distributor inventively provides the steps:

a) Prior to the operation of the lubricant distributor: definition of a temporal duration of a lubrication cycle and a time proportion, within which the metering piston should be located in one of its end positions in proper lubrication operation.

b) During the operation of the lubricant distributor: measuring of the time proportion, during which the metering piston is located in one of its end position facing the hall sensor, by evaluating the signal detected from the Hall sensor;

c) Comparison of the measured time proportion to the defined time proportion;

d) Outputting of an alarm signal if the measured time proportion deviates away from a defined time proportion by a predetermined tolerance.

Here the steps b) to d) are preferably carried out in a periodically repeating manner in order to thus achieve a continuous monitoring.

In the mentioned step d) an alarm signal "line tear" can be triggered if the measured time proportion is longer outside the tolerance compared to the defined time proportion. Then the metering piston namely finds a too-small resistance upon its actuation, so that it reaches the end position faster and accordingly remains longer therein per lubrication cycle.

Accordingly in step d) an alarm signal "line blockage" can be triggered if the measured time proportion is shorter outside the tolerance compared to the defined time proportion. Then the metering piston namely does not arrive fast enough, ore even not at all, in its end position, which provides an indication that the line is clogged.

The definition of the temporal duration of a lubrication cycle and/or of the time proportion, within which the metering piston should be located in one of its end positions in proper lubrication operation, can be adapted in case of change in external environmental conditions. The background here is the following: Slow changes—e.g. the transition from the summer to the fall and the associated temperature- and speed-change—can be compensated or taken into account in the evaluation of the sensor signals. In order to avoid false alarms—if, for example, a to-be-lubricated system is switched off in the winter corresponding reference values for this operating state are stored, which are assigned to slower movements, however, later in the summer other reference values are required in commencement of operation, since correspondingly faster processes occur—it is necessary to carry out a temperature compensation in the sensor or in the evaluation of its signals.

The inventive Hall sensor (also called Hall probe or Hall encoder) is as such a standard, available component that uses the Hall effect. If a Hall sensor is flowed-through by a current and placed in a magnetic field extending perpendicular thereto, it delivers an output voltage that is proportional to the product of the magnetic field strength and current (Hall effect). A Hall sensor also provides a signal if the magnetic field in which it is located is constant.

Using the proposed solution it is possible, in a simple manner, to monitor the lubricant lines downstream of the lubricant distributor out to the lubrication points. It is especially possible to recognize relatively simply and economically, as well as in a process-stable manner, a blockage in the lubricant line; likewise a break or a tear of a line can be quickly detected.

Here the invention establishes a detection of an end position of the metering piston based on the Hall principle so that the function of the lubricant distributor can me monitored in a very stable manner and with few components. In addition, the connected lubricant lines from the distributor out to the lubrication points, in particular out to the bearings, can be monitored for incipient blockage and tear.

In the detector device wherein the Hall sensor is also located the magnetic field is formed or generated by a corresponding element (magnet). The metering piston or the control piston, which is preferably comprised of standard steel (in particular mild steel), however not of stainless steel, changes this magnetic field, from which the Hall effect results. This change is detected by the Hall sensor and is evaluated. However, the sleeve-shaped receptacle for the Hall sensor is comprised of stainless steel.

The invention is preferably used in two-line systems and in progressive systems. As is known, in two-line systems two feed lines—controlled by a rerouting device—are alternately supplied with lubricant. In progressive systems the lubricant is pumped to the progressive distributors; from there the lubrication points are supplied via distributor devices.

BRIEF DESCRIPTION OF THE DRAWINGS

An exemplary embodiment of the invention is depicted in the drawings.

DETAILED DESCRIPTION

Figure 1:
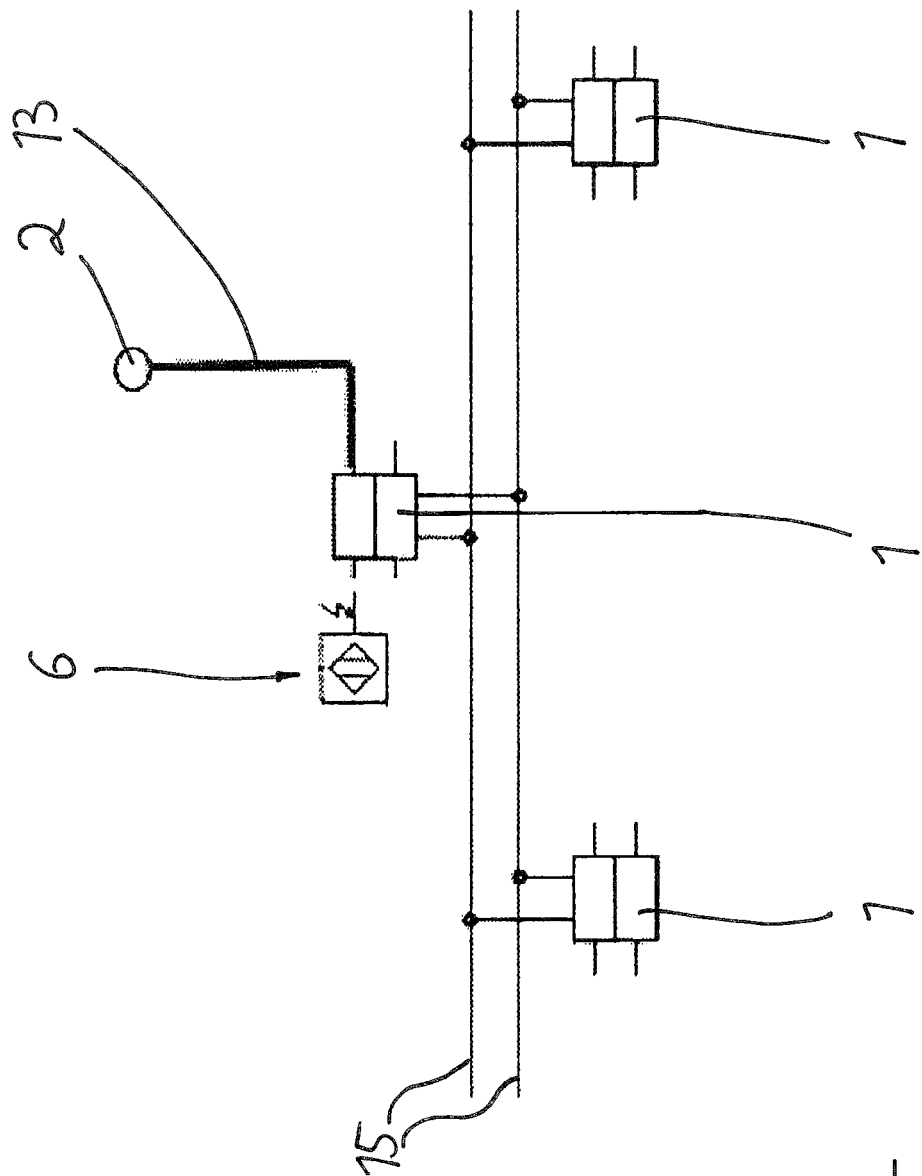
FIG. 1 schematically shows a lubricant supply system for lubrication points, in particular for bearing points.

In FIG. 1 a lubricant supply system is seen, using which lubrication points 2 in the form of bearing points are supplied with lubricant, e.g. lubricating oil. For this purpose the lubricant is pumped via two main lines, wherein in this respect reference is made to the embodiments in the above-mentioned publications, wherein details thereof are explained.

Lubricant distributors 1 are connected by their inputs to the two main lines 15. The lubricant distributor 1 supplies the lubrication point (bearing point) 2 out from a lubricant outlet 14 via a line 13. Here the lubricant distributor 1 comprises detector device, using which the position of a metering piston or of its presence at a defined point of its cylinder bore can be detected.

Figure 2:
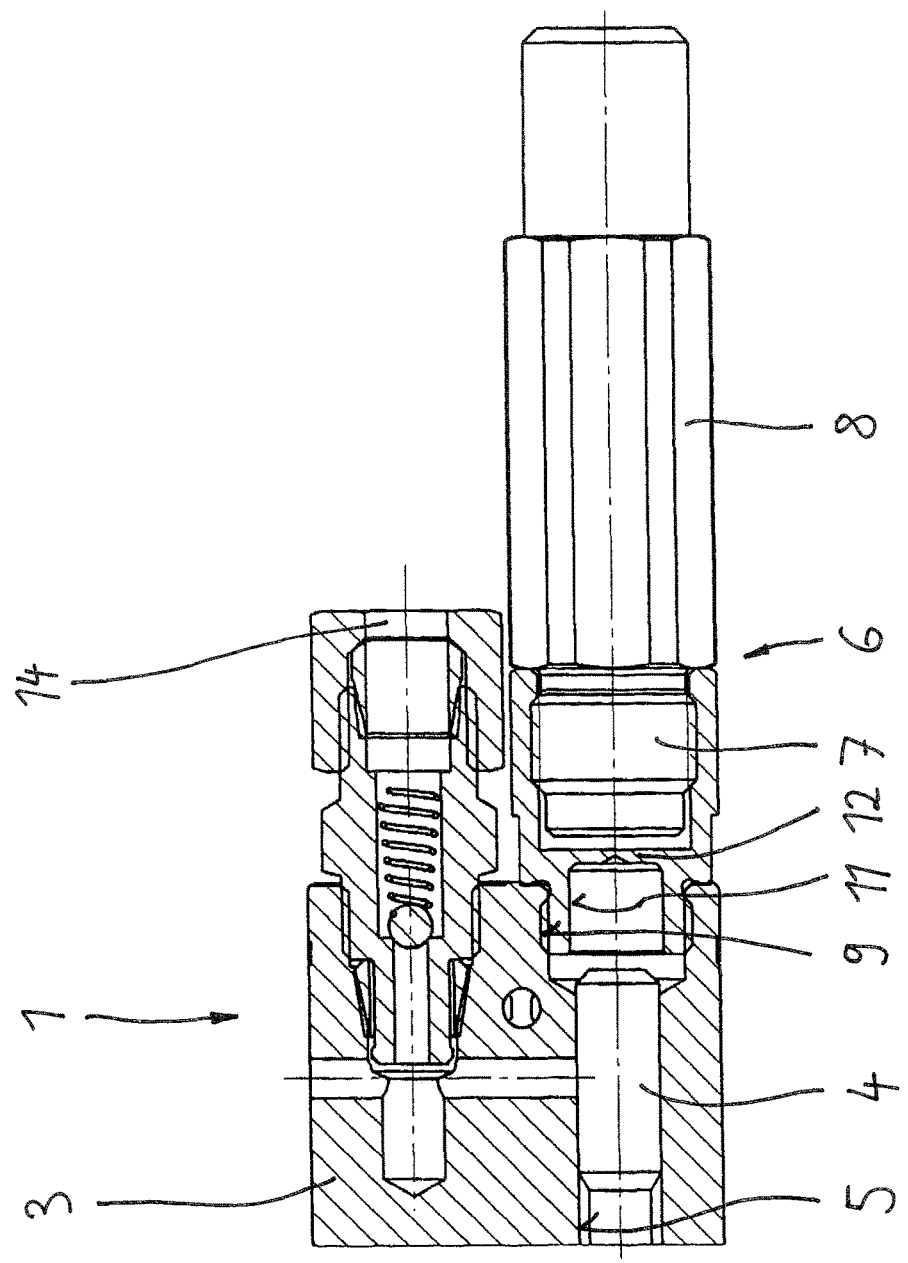
FIG. 2 shows a lubricant distributor in section A-A according to FIG. 3.
Figure 3:
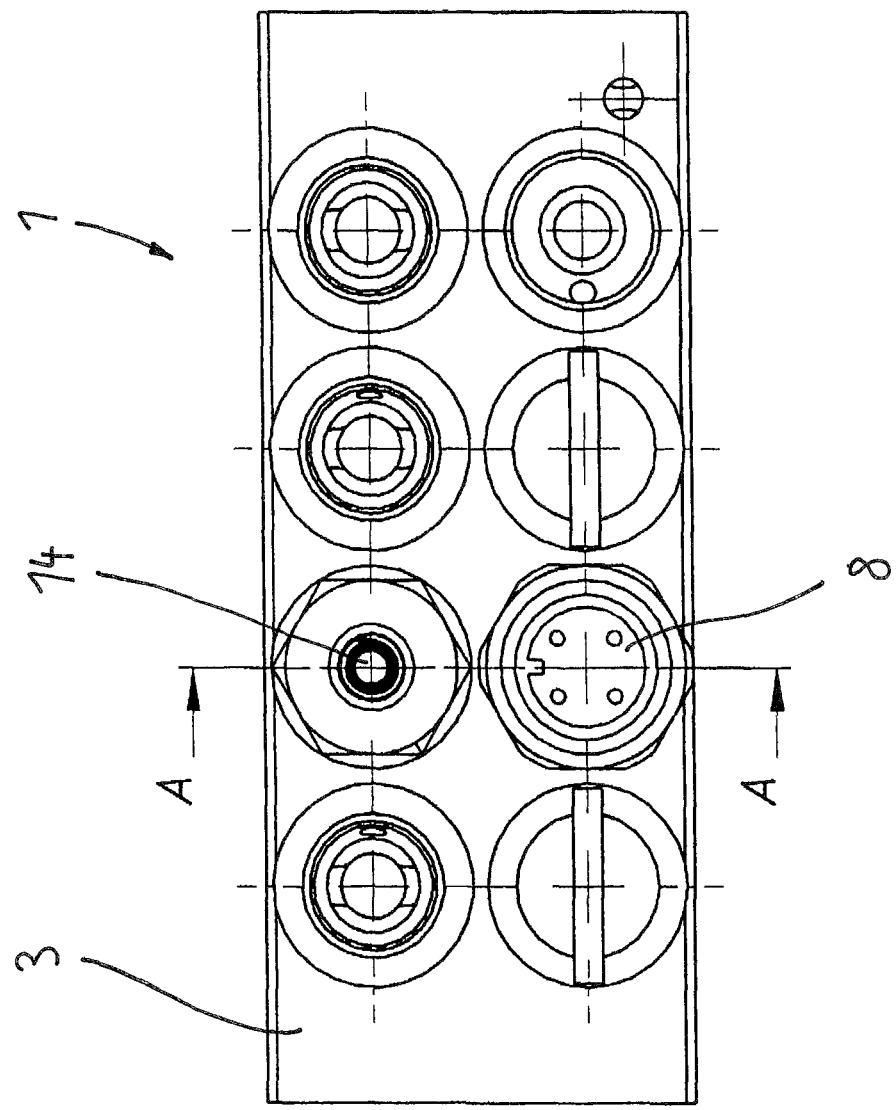
FIG. 3 shows the lubricant distributor according to FIG. 2 in front view.
Figure 4:
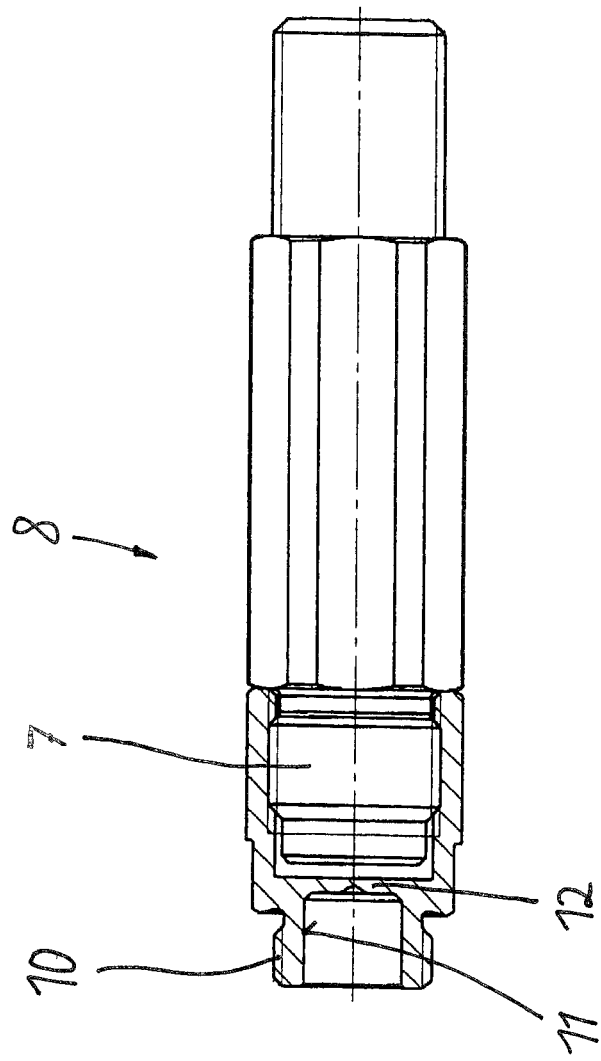
FIG. 4 shows an adapter piece of the lubricant distributor in partially sectioned side view.

The construction of the lubricant distributor 1 and of a specific part thereof, namely an adapter piece 8, is apparent from FIGS. 2 to 4.

Accordingly the lubricant distributor 1 includes a lubricant distributor housing 3, wherein—and the following embodiments relate only to the elements that in the present case are relevant for the inventive concept—a cylinder bore 5 is introduced wherein a metering piston 4 is disposed in a translationally movable manner. In this regard reference is made to the mentioned previously-known solutions.

It is essential that a detector device 6 is disposed, namely screwed, on the one axial end of the cylinder bore 5. The detector device 6 is provided with a Hall sensor 7, using which it can be determined when the metering piston has reached its axial end position in the cylinder bore 5. The Hall sensor according delivers a signal when, and only when, the metering piston is located in its one axial end position. The detector device 6 is configured as a sleeve-shaped adapter piece 8, which (see FIG. 4) includes a screw section 10 on its one axial end. Using this screw section 10 the adapter piece 8 is screwed in a threaded section 9, which is incorporated in the axial end region of the cylinder bore 5.

As is apparent from FIG. 2 and from FIG. 4, in the axial end region that faces the cylinder bore 5 the adapter piece 8 includes an entry bore 11 that has a slightly larger diameter than the metering piston 4. The metering piston 4 can thus enter into said entry bore 11 in order to reach its axial end position.

The receiving space wherein the Hall sensor 7 is disposed and the space that is formed by the entry bore 11 are separated from each other by a base 12. This ensures the impermeability of the system in a simple manner.

Figure 5:
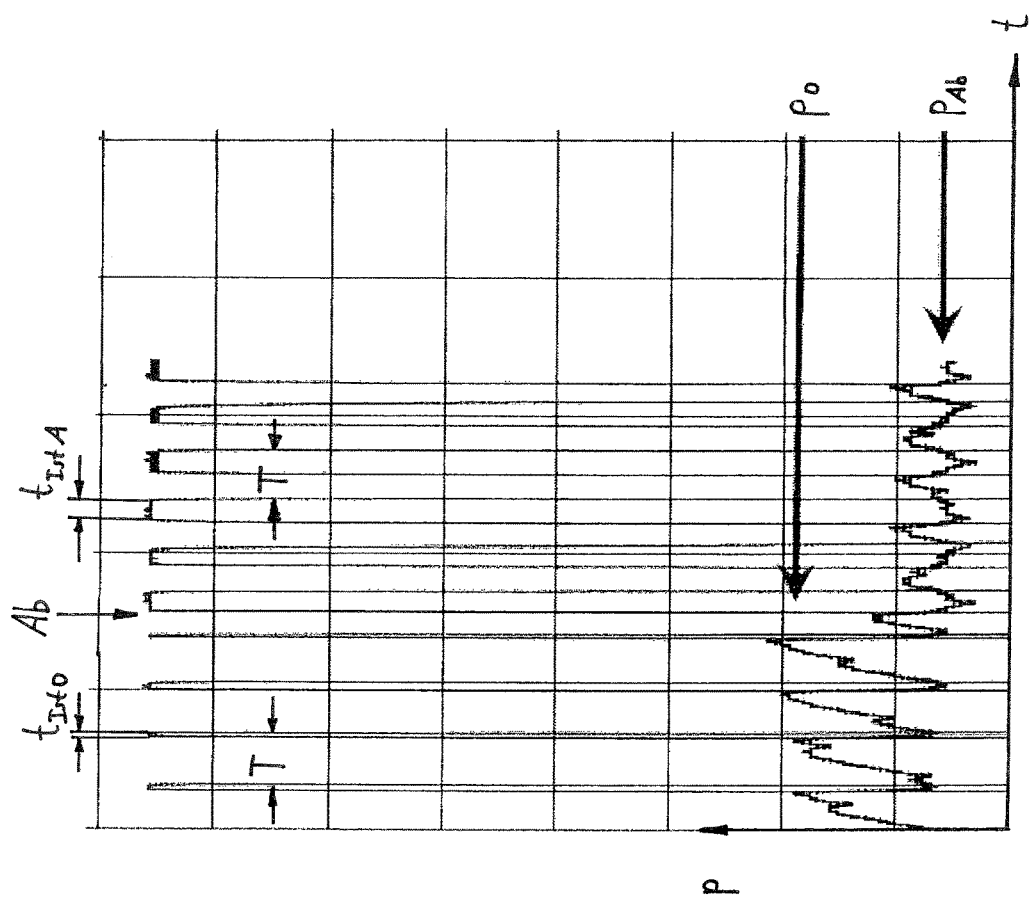
FIG. 5 shows a time diagram wherein a number of lubrication cycles are reproduced wherein the signal detected by a Hall sensor and the pressure of the lubricant in the lubricant outlet is recorded for the lubrication cycles.

For the operation of the proposed monitoring method reference is made to FIG. 5. Here the case is schematically indicated that initially there is a proper lubrication operation.

Then, however, a tear occurs of a line 13, which leads to a no-longer-proper operation, which is determined using the proposed method. In FIG. 5 the time t is plotted on the abscissa. Said tear of the line occurs at the time that is marked by "Ab."

For the applied pressure p it can be provided that before the tear this is present regularly with a course that is marked by p0. Starting from the tear there is a (fallen) pressure course, which is marked by pAb.

While the temporal duration T of a lubrication cycle always remains constant, i.e., namely is the same before the tear and after the tear, the time proportion changes wherein the metering piston—detected by Hall sensor 7—is located in its end position.

As long as there is proper operation, the intact line 13 opposes the lubricant with a certain resistance, so that the metering piston 4 requires its time to arrive into the end position. Accordingly the time proportion tIst 0 (see FIG. 5, top) is relatively short; this is the period of time that is between the reaching of the axial end position of the metering piston 4 and the rerouting of the lubricant in the main lines 15.

However, if the line 13 tears, it results now that the metering piston 4, as a consequence of the reduced line resistance, reaches the axial end position faster. Accordingly the time proportion increases to a value tIst A, which is significantly longer than the value tIst 0.

By monitoring the actual time proportion tIst it is thus managed, by comparison to a typical and stored target value tSoll for proper operation, to conclude whether proper lubrication operation is performed or not.

According to the invention a functional control of the lubricant distributor 1 thus occurs using a Hall sensor. The Hall sensor 7 is screwed into the adapter piece 8, which is preferably comprised of stainless steel. The end position of the metering piston 4 in the lubricant distributor 1 can be reliably detected by the sleeve-shaped adapter 8.

Different thread connections on the lubricant distributor housing 3 can thus be adapted to. The lubricant distributor 1 is thus completely closed; an exchange of the Hall sensor 7 is also possible during operation of the lubricant distributor 1. The sealing problems in the pressure region or sensor region occurring in the previously known solutions are advantageously omitted.

The Hall sensor or the detector device(s) can be designed as a universal sensor.

Using the proposed Hall sensor a detection can thus be effected, at which times the metering piston 4 is located in the axial end position.

In this way it is also possible to compare the respective most-recent movement diagrams with newly recorded measured values in current lubrication cycles, in order to test whether there is proper operation. In a two-line distributor, if the diagram course changes significantly—i.e. the time proportion tSoll increases—with respect to the previously stored diagram courses—a line break of the connected lubricant line can be deduced. Of course this also analogously applies in the case of a progressive distributor instead of a two-line distributor.

It correspondingly holds that with a shortening of the time proportion tSoll in a two-line distributor an incipient blockage can be assumed.

The Hall sensor 7 or the adapter piece 8 can be designed such that, for example, the alarm output is output to the switch output, which indicates that the lubricant line is defective or an incipient blockage threatens.

REFERENCE NUMBER LIST

1 Lubricant distributor
2 Lubrication point
3 Lubricant distributor housing
4 Metering piston
5 Cylinder bore
6 Detector device
7 Hall sensor
8 Adapter piece
9 Threaded section
10 Screw section
11 Entry bore
12 Base
13 Line
14 Lubricant outlet
15 Main line
T Temporal duration (period of a lubrication cycle)
t Time
tSoll Target time proportion
tIst Actual time proportion
Ab Time of the line tear
p Pressure
p0 regular pressure course
pAb pressure course with line tear

The invention claimed is:

1. A lubricant distributor for the delivery of lubricant to at least one lubrication point, wherein the lubricant distributor includes a lubricant distributor housing, wherein a metering piston is disposed movably back-and-forth in a cylinder bore in the housing, wherein a detector device is mounted at the bore and, using the detector device, a position of the metering piston can be detected in at least one piston position, wherein the detector device comprises a Hall sensor disposed in a space in an adapter piece, wherein the adapter piece is disposed on the lubricant distributor housing such that the Hall sensor can detect the metering piston when the metering piston is located in a first end position in the cylinder bore,
wherein
the adapter piece includes an entry bore facing the metering piston, the entry bore being configured to receive a portion of the metering piston, and
wherein the space is separated from the entry bore by a continuous base.

2. The lubricant distributor according to claim 1, wherein a threaded section connects axially to the cylinder bore in at least one axial end region of the cylindrical bore, in which threaded section a screw section of the adapter piece is screwed-in.

3. The lubricant distributor according to claim 2, wherein a diameter of the cylinder bore is less than a diameter of the threaded section.

4. A method of operating the lubricant distributor according to claim 1 comprising:
a) prior to operating the lubricant distributor, defining a temporal duration (T) of a lubrication cycle and defining a time proportion ($t_{Soll}$) of the lubrication cycle during which the metering piston should be located in the entry bore of the detector during proper operation of the lubricant distributor;
b) during operation of the lubricant distributor, measuring a time proportion ($t_{Ist}$) during which the metering piston is located in the entry bore by evaluating a signal produced by the Hall sensor;
c) comparing the measured time proportion ($t_{Ist}$) to the defined time proportion ($t_{Soll}$); and
d) outputting an alarm signal if the measured time proportion is greater than the defined time proportion ($t_{Soll}$) by a first predetermined amount or less than the defined time proportion ($t_{Soll}$) by a second predetermined amount.

5. The lubricant distributor according to claim 1, wherein a screw section of the adapter piece is screwed into an axial threaded section of the housing at an end of the cylinder bore, and a diameter of the threaded section is greater than a diameter of the cylinder bore.

6. The lubricant distributor according to claim 1, wherein, when the metering piston is located in the first end position, the portion of the metering piston is located in the entry bore of the adapter piece.

7. A method for operating a lubricant distributor for the delivery of lubricant to at least one lubrication point, wherein the lubricant distributor includes a lubricant distributor housing wherein a metering piston is disposed movably back-and-forth in a cylinder bore in the housing, wherein a detector device is mounted at the bore and using which a position of the metering piston can be detected in at least one piston position, wherein the detector comprises a Hall sensor disposed in a space in an adapter piece, wherein the adapter piece is disposed on the lubricant distributor housing such that the Hall sensor can detect the metering piston when the metering piston is located in a first end position in the cylinder bore, wherein the method includes:
 a) prior to the operation of the lubricant distributor defining a temporal duration (T) of a lubrication cycle and a time proportion ($t_{Soll}$) of the lubrication cycle within which the metering piston should be located in the first end position of the cylindrical bore during proper operation of the lubricant distributor;
 b) during the operation of the lubricant distributor: measuring a time proportion ($t_{Ist}$), during which the metering piston is located in the first end position by evaluating a signal produced by the Hall sensor;
 c) comparing the measured time proportion ($t_{Ist}$) to the defined time proportion ($t_{Soll}$); and
 d) outputting a first alarm signal indicative of a line tear if the measured time proportion is greater than the defined time proportion ($t_{Soll}$) by a predetermined amount.

8. The method according to claim 7, wherein steps b) to d) are carried out in a periodically repeating manner.

9. The method according to claim 7, including outputting a second signal, different from the first signal, indicative of a line blockage if the measured time proportion ($t_{Ist}$) is less than the defined time proportion ($t_{Soll}$) by more than the predetermined amount.

10. The method according to claim 7, including redefining the temporal duration and the time proportion based on changing external environmental conditions.

11. A lubricant distributor for delivering lubricant to at least one lubrication point, the lubricant distributor comprising:
 a lubricant distributor housing including a cylinder bore;
 a metering piston mounted for reciprocal movement in the cylinder bore;
 a detector connected at an end of the cylinder bore, the detector including an entry bore configured to receive a portion of the metering piston, the entry bore being in fluid communication with the cylinder bore, and the detector including an interior space separated from the entry bore by a wall and the detector including a Hall sensor in the interior space,
 wherein the detector is configured to output a detection signal in response to detecting the portion of the metering piston in the entry bore.

12. The lubricant distributor according to claim 11, wherein the cylinder bore includes an enlarged end portion, wherein the detector includes an adapter portion sealingly mounted in the enlarged end portion of the cylinder bore, and wherein the entry bore is located in the adapter portion.

13. The lubricant distributor according to claim 11, wherein the metering piston extends through a first portion of the cylinder bore into the enlarged end portion of the cylinder bore and into the entry bore of the detector.

14. A method of operating the lubricant distributor according to claim 11 comprising:
 a) prior to operating the lubricant distributor, defining a temporal duration (T) of a lubrication cycle and defining a time proportion ($t_{Soll}$) of the lubrication cycle during which the portion of the metering piston should be located in the entry bore of the detector during proper operation of the lubricant distributor;
 b) during operation of the lubricant distributor, measuring a time proportion ($t_{Ist}$) during which the portion of the metering piston is located in the entry bore by evaluating the detection signal;
 c) comparing the measured time proportion ($t_{Ist}$) to the defined time proportion ($t_{Soll}$); and
 d) outputting an alarm signal if the measured time proportion is greater than the defined time proportion ($t_{Soll}$) by a first predetermined amount or is less than the defined time proportion ($t_{Soll}$) by a second predetermined amount.

15. The method according to claim 14, wherein outputting an alarm comprises outputting a first alarm signal if the measured time proportion is greater than the defined time proportion ($t_{Soll}$) by the first predetermined amount and outputting a second alarm signal if the measured time proportion is less than the defined time proportion ($t_{Soll}$) by the second predetermined amount.

* * * * *